United States Patent
Yadav

(10) Patent No.: US 7,343,488 B2
(45) Date of Patent: Mar. 11, 2008

(54) METHOD AND APPARATUS FOR PROVIDING DISCRETE DATA STORAGE SECURITY

(75) Inventor: Satyendra Yadav, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 816 days.

(21) Appl. No.: 10/261,825

(22) Filed: Sep. 30, 2002

(65) Prior Publication Data

US 2004/0064713 A1     Apr. 1, 2004

(51) Int. Cl.
*H04L 9/00*     (2006.01)
(52) U.S. Cl. .................. 713/165; 713/193; 726/23
(58) Field of Classification Search ........... 713/200, 713/193, 165, 153; 726/2, 21, 23
See application file for complete search history.

(56) References Cited

U.S. PATENT DOCUMENTS

| | | | |
|---|---|---|---|
| 5,737,523 A * | 4/1998 | Callaghan et al. ............ 726/21 |
| 6,243,667 B1 * | 6/2001 | Kerr et al. ..................... 703/27 |
| 6,260,120 B1 * | 7/2001 | Blumenau et al. .......... 711/152 |
| 6,286,084 B1 * | 9/2001 | Wexler et al. .............. 711/152 |
| 6,421,711 B1 * | 7/2002 | Blumenau et al. .......... 709/213 |
| 6,510,350 B1 * | 1/2003 | Steen et al. ..................... 700/9 |
| 6,523,096 B2 * | 2/2003 | Sanada et al. .............. 711/152 |
| 6,771,673 B1 * | 8/2004 | Baum et al. ................. 370/535 |
| 6,826,190 B1 * | 11/2004 | Petri ........................... 370/400 |
| 6,931,530 B2 * | 8/2005 | Pham et al. ................. 713/165 |
| 2002/0199017 A1 * | 12/2002 | Russell ....................... 709/243 |

* cited by examiner

*Primary Examiner*—Nasser Moazzami
*Assistant Examiner*—Shanto M Z Abedin
(74) *Attorney, Agent, or Firm*—Marger Johnson McCollom, PC

(57) ABSTRACT

The invention is a system to secure data. The data security system includes data, a data security system enforcer, a local policy database, and a centralized policy manager. When a block level file access request is received, the data security system enforcer checks the local policy database to see if the file access request is authorized. If the file access request is authorized, then the file access request is performed. Intrusions may be determined based on the type and number of unauthorized file access requests. Forensic analysis may be performed on a database logging file access requests (both authorized and unauthorized).

12 Claims, 9 Drawing Sheets

METHOD AND APPARATUS FOR PROVIDING DISCRETE DATA STORAGE SECURITY

FIELD

This invention pertains to data storage, and more particularly to securing distributed data storage against outside attack.

BACKGROUND

The amount of data accessible across networks has been steadily growing. And along with the growth of the data quantity has been the data's lure to attackers. There are frequent reports of websites being attacked: either because data residing on servers is of interest to hackers, or because the hackers want to leave their mark: the electronic equivalent to graffiti.

Realizing the vulnerability of the data, some designs physically separate the data from the server. To access the data, the server sends a request to the storage system on which the data resides. Separated from external points, the storage system typically may only be accessed through the server: direct attack of the storage system is not possible.

But such a solution overlooks a central weakness. Once the server itself has been compromised, the connection between the server and the storage system is an open door to hackers. With root access to the server, the data in the storage system are just as accessible as if they were stored within the server.

FIG. 1 illustrates this vulnerability. In FIG. 1, server 105 is coupled to storage system 110, which includes data (or document) 112. When a user on computer 115 wishes to access data 112, the user connects to server 105 across network 120 and requests data 112. (Note that computer 115 is not limited to any particular design, and may be a desktop or portable computer, an Internet appliance, a personal digital assistant (PDA), a wireless computer, or any other device capable of interacting server 105 and receiving data 112.) Server 105 retrieves data 112 from storage system 110, and delivers it to computer system 115.

But when a hacker uses computer 125 to hack into server 105 and comprise root access, the hacker gains superuser privileges. Since root access normally includes superuser privileges, the system is wide open to the hacker, who may access data 112 without any limitation.

A need remains for a way to provide data security that addresses these and other problems associated with the prior art.

DETAILED DESCRIPTION

Figure 1:
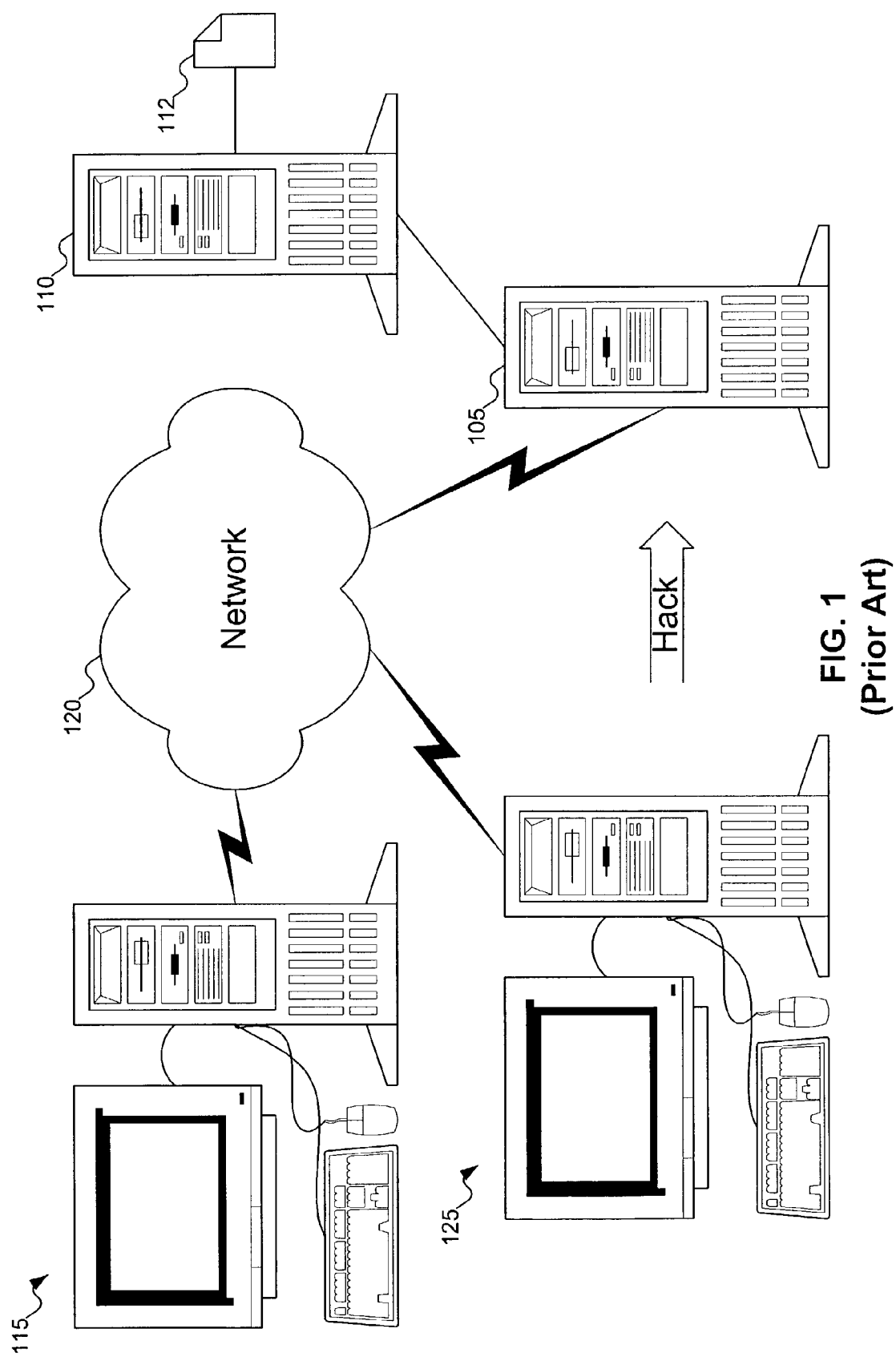
FIG. 1 shows devices communicating across a network according to the prior art.
Figure 2:
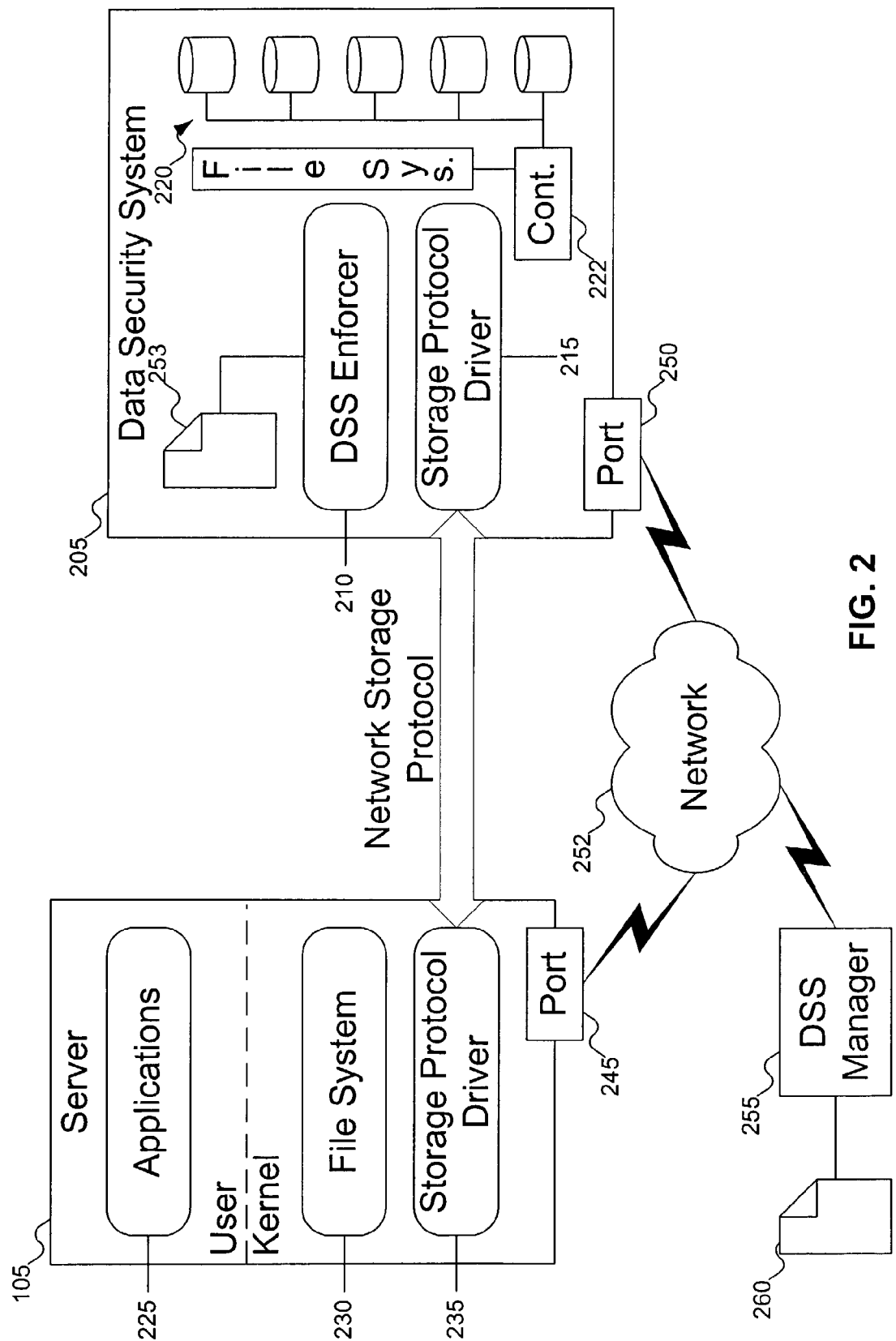
FIG. 2 shows the server of FIG. 1 and a data security system configured to use a data storage security driver, according to an embodiment of the invention.

FIG. 2 shows the server of FIG. 1 and a data security system configured to use a data storage security driver, according to an embodiment of the invention. In FIG. 2, instead of using a normal storage system, data security system (DSS) 205 is used. DSS 205 includes DSS Enforcer 210, storage protocol driver 215, and storage devices 220 controlled by controller 222. DSS Enforcer is responsible for enforcing a data security policy on DSS 205. DSS 205 uses storage protocol driver 215 to communicate with server 105 using whatever network storage protocol is desired. Finally, storage devices 220 may be any variety of storage devices: fixed disks, optical disks, random access memory (RAM), flash memory, or any other variety of storage that may be used. Further, different types of storage may be mixed as storage devices 220.

Server 105 is shown in greater detail, as including applications 225 that use data stored on DSS 205 (the data used by applications 225 may be either read from or written to DSS 205). In the kernel of the operating system on server 105, file system 230 issues read and write requests for files stored on DSS 205. These requests are delivered to storage protocol driver 235, which communicates with the storage protocol driver 215 in DSS 205 to effect an interchange of data.

Both server 105 and DSS 205 include ports. A port is a channel endpoint for communication, and is a logical concept. Using ports helps prevent different communications channels from becoming mixed. When server 105 wants to communicate with DSS 205, server 105 selects port 245 from the available ports, and selects port 250 on DSS 205 with which to open the communications channel. Server 105 and DSS 205 then communicate across network 252 (typically, an intranet, but a person skilled in the art will recognize other types of networks that may be used as network 252) using the communications channel defined by the selected ports.

DSS Enforcer 210 is designed to be a lower operating system kernel component. That is, it operates at a lower level than the storage file system: specifically, at the block level. DSS Enforcer 210 receives block level file access requests (be they requests to read or write a file) and determines if the requests are to be granted.

To determine whether a request is to be granted, DSS Enforcer 210 looks at the Internet Protocol (IP) address of the source, the port on the source, the IP address of the destination (that is, the IP address of DSS 205), the port on DSS 205, and the direction of data flow (that is, whether the request is a read or write command). DSS Enforcer 210 then checks local policy database 253 to determine if the combination of source IP address, source port, destination IP address, destination port, and dataflow direction is permitted.

Note that although FIG. 2 shows the requesting computer as being server 105, embodiments of the invention may be generalized to any computing device requesting data from DSS 205. That is, the source IP address and port do not have to be those of server 105. Similarly, although in the embodiment described above the source IP address, source port, destination IP address, destination port, and dataflow direction are checked, a person skilled in the art will recognize other combinations of elements that may be used to determine if the request is authorized.

The advantage of using local policy database 253 to determine if certain requests are to be granted or denied lies in the number of possible combinations of requests. As discussed further below with reference to FIG. 3, there are different types of policies that may be set. Thus, DSS Enforcer 210 may refuse a request to write to a file on DSS 205, where the write request may be coming from a hacker who has compromised server 105 (the policy does not allow any write comments from server 105). Similarly, DSS Enforcer 210 may refuse a read request, protecting the data from being read by an unauthorized user. This may be useful in a situation where the data is confidential but stored on a server that is externally accessible to authorized personnel based on the policy.

The contents of local policy database 253 may be set/changed using DSS Manager 255. DSS Manager 255 is a computing device specifically designed to interact with DSS Enforcer 210. DSS Manager is physically isolated from any external points, and may not be reached even across network 252, let alone from outside the data center. This prevents DSS Manager 255 from being attacked from the outside, to make an unauthorized change to local policy database 253.

In addition to state-of-the-art authentication mechanisms and encrypted communication between DSS Manager 255 and DSS Enforcer 210, DSS Manager 255 may communicate with DSS Enforcer 210 using a very specific set of communications protocols. For example, DSS Manager 255 may communicate with DSS 205 using one specific port. Or DSS Manager 255 may communicate with DSS 205 using a specified routing path. If DSS Enforcer 210 receives a communication from DSS Manager 255 that does not follow the required protocols, then DSS Enforcer 210 knows that the communication is not authorized, and ignores the communication. This prevents someone from outside DSS 205 attempting to change local policy database 253 without going through DSS Manager 255 (which, as just discussed, may only be accessed directly from within the data center). On the other hand, if the communication follows the appropriate protocols, then DSS Enforcer 210 may update local policy database 253 to reflect the new policy. For example, if DSS Manager 255 sends new local policy database 260 to DSS 205 using the required protocols, then DSS Enforcer 210 updates/replaces local policy database 253 with local policy database 260.

Figure 3:
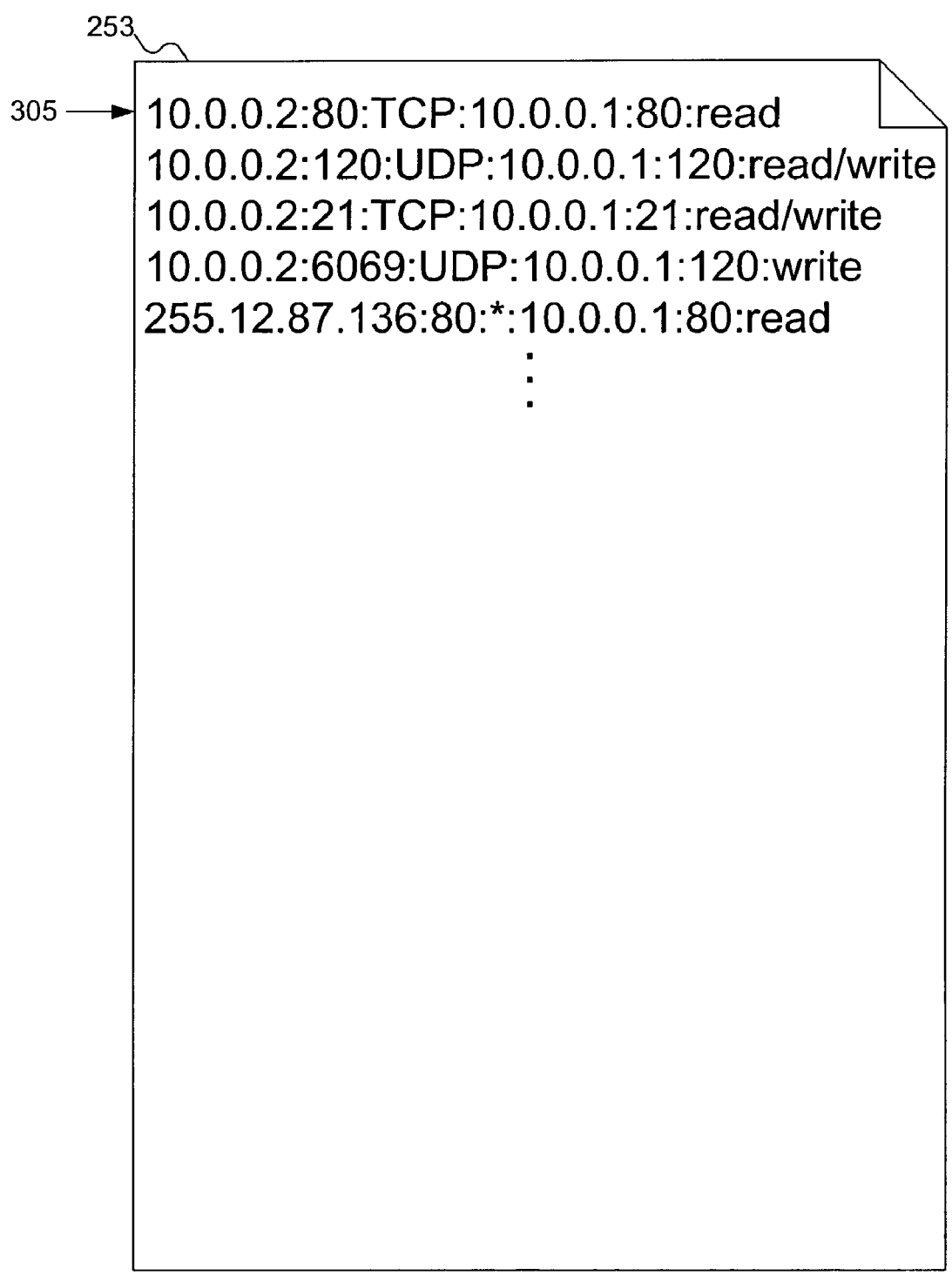
FIG. 3 shows an example local policy database as used by the data security system of FIG. 2, according to an embodiment of the invention.

FIG. 3 shows an example local policy database as used by the DSS of FIG. 2, according to an embodiment of the invention. Local policy database 253 shows several entries. Each entry consists of six fields, separated by colons (:). The fields specify the source IP address, the source port, the protocol, the destination IP address, the destination port, and the dataflow direction. Each entry identifies a particular combination for a file access request that may be granted. For example, consider entry 305, a particular entry in local policy database 253. Entry 305 specifies that read requests coming from source IP address 10.0.0.2, port 80, using the transmission control protocol (TCP), and directed to source IP address 10.0.0.1, port 80, are to be granted.

As discussed above with reference to FIG. 2, when the DSS Enforcer receives a file access request, the DSS Enforcer compares the file access request against local policy database 253. If an entry in local policy database 253 allows the file access request, then the file access request is granted. If no entry in local policy database 253 allows the file access request, then the file access request is denied.

A person skilled in the art will recognize that not all the fields shown in local policy database 253 need be used in a local policy database, and that other fields (not shown) might be used. For example, instead of the default setting being to block unrecognized file access requests, local policy database 253 might be configured specify whether particular file access request combinations are to be granted or denied. Of local policy database 253 might include applications permitted to make file access requests. Other variations are also possible.

DSS Enforcer 210 may also be configured to generate alerts to a central security system in the event a storage request violates policy. This allows a security administrator to receive notification of a hacker attack while it is in progress. In addition, these alerts also leave a trail of events that may be further processed using forensic analysis of the intrusion attempts.

Figure 4:
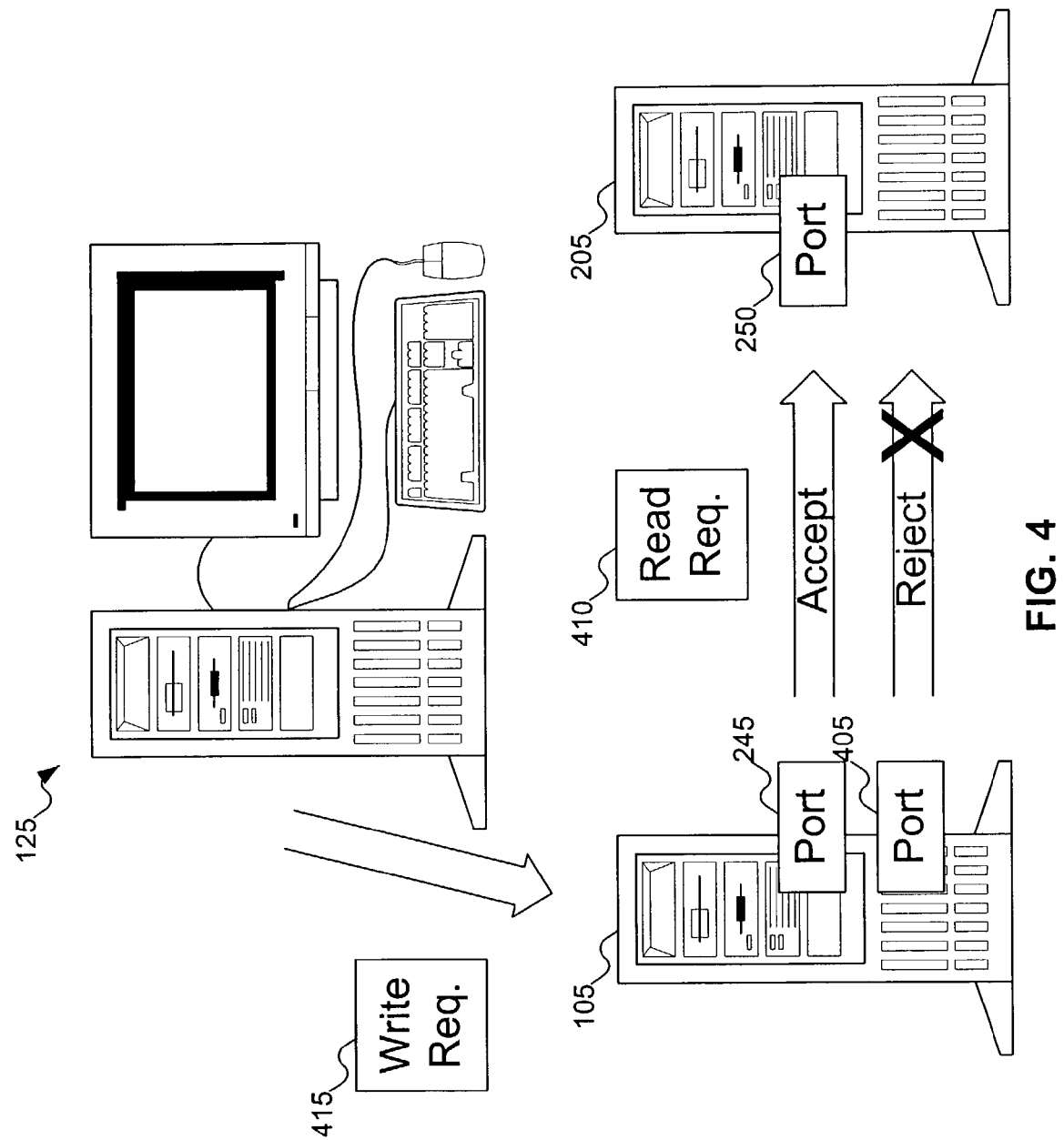
FIG. 4 shows the data security system of FIG. 2 using the local policy database to FIG. 4 to accept and reject various file access requests, according to an embodiment of the invention.

FIG. 4 shows the data security system of FIG. 2 using the local policy database to FIG. 4 to accept and reject various file access requests, according to an embodiment of the invention. In FIG. 4, server 105 is shown making requests of data security system 205. For example, assume that the policy is that DSS 205 accept only read requests from server 105. When server 105 issues read data request 405 from port 245 to port 250 on DSS 205, the request is recognized as authorized. But after a hacker hacks into server 105 (using hacker computer 125), the hacker attempts to write data to DSS 205. When hacker computer 125 issues a write request to DSS 205 (via server 105), since the policy allows only read requests, the request is rejected. The DSS Enforcer may also inform a security administrator of the abnormal behavior of server 105, alerting the administrator to the possibility that server 105 has been hacked.

Figure 5A:
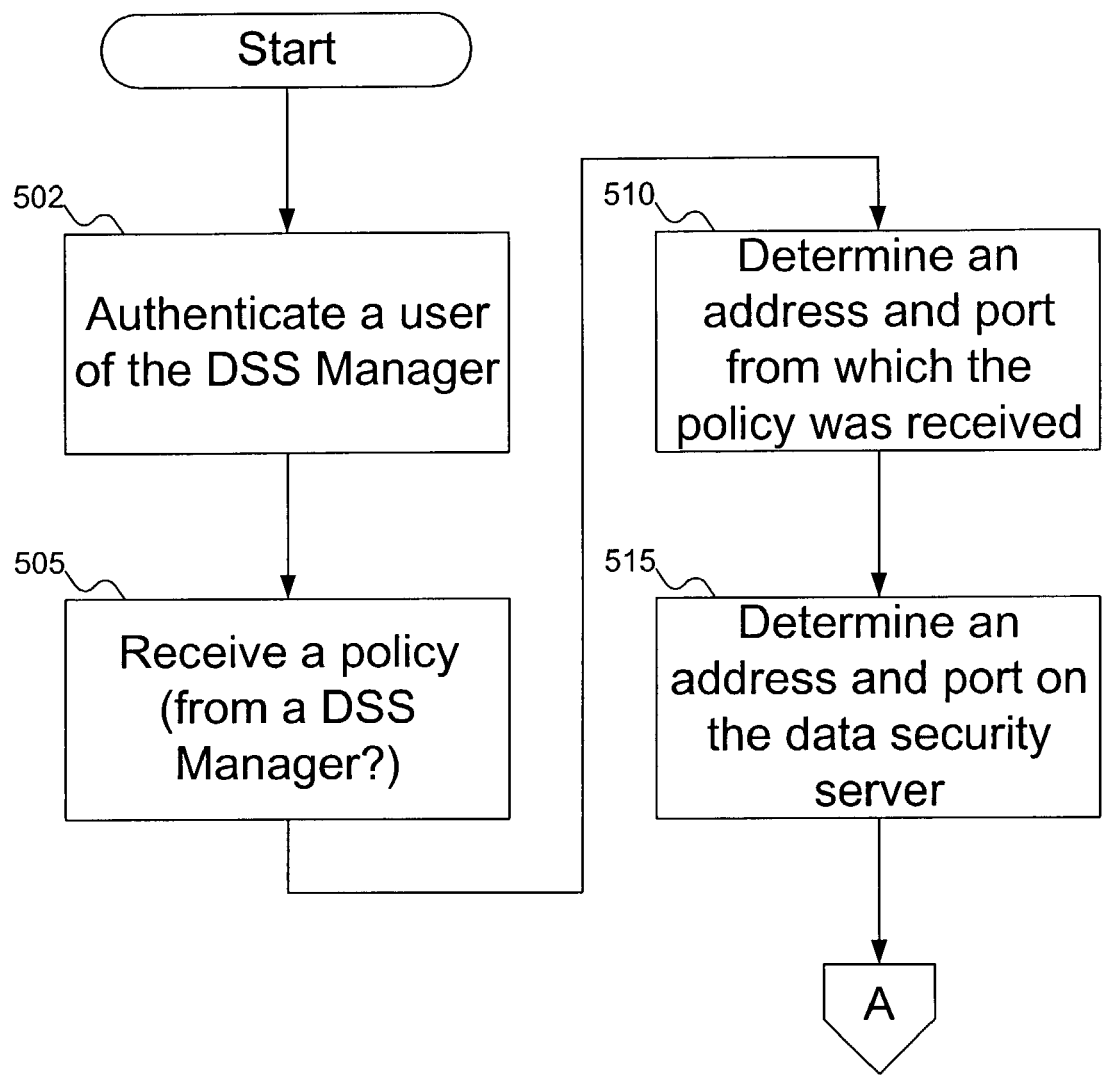
FIGS. 5A-5B show a flowchart of the procedure used by the data storage security driver of FIG. 2 to update the local policy database, according to an embodiment of the invention.
Figure 5B:
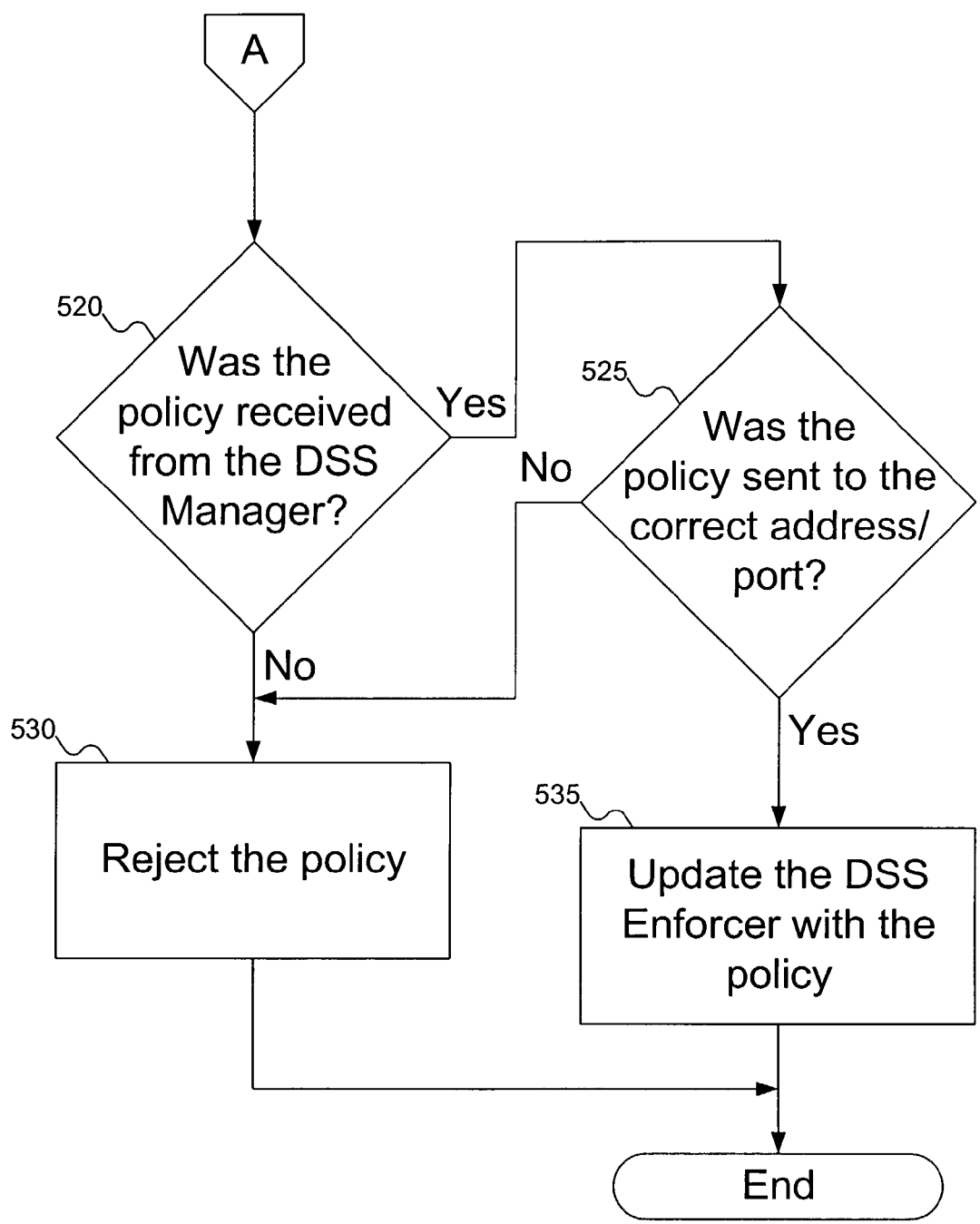

FIGS. 5A-5B show a flowchart of the procedure used by the data storage security invention. In FIG. 5A, at block 502, the DSS Enforcer authenticates a user of the DSS Manager. At block 505, the data storage security driver receives a policy (which may or may not have originated at the DSS Manager). At block 510, the data storage security driver determines the source IP address and port. At block 515, the data storage security driver determines the destination IP address and port. At decision point 520 (FIG. 5B), the data storage security driver decides if the policy originated properly from the DSS Manager. If so, then at decision point 525 the data storage security driver decides if the policy was sent to the correct destination IP address and port. If the policy originated or terminated at the wrong place, then at block 530 the data storage security driver rejects the policy. Otherwise, at block 535 the data storage security driver applies the policy.

Figure 6A:
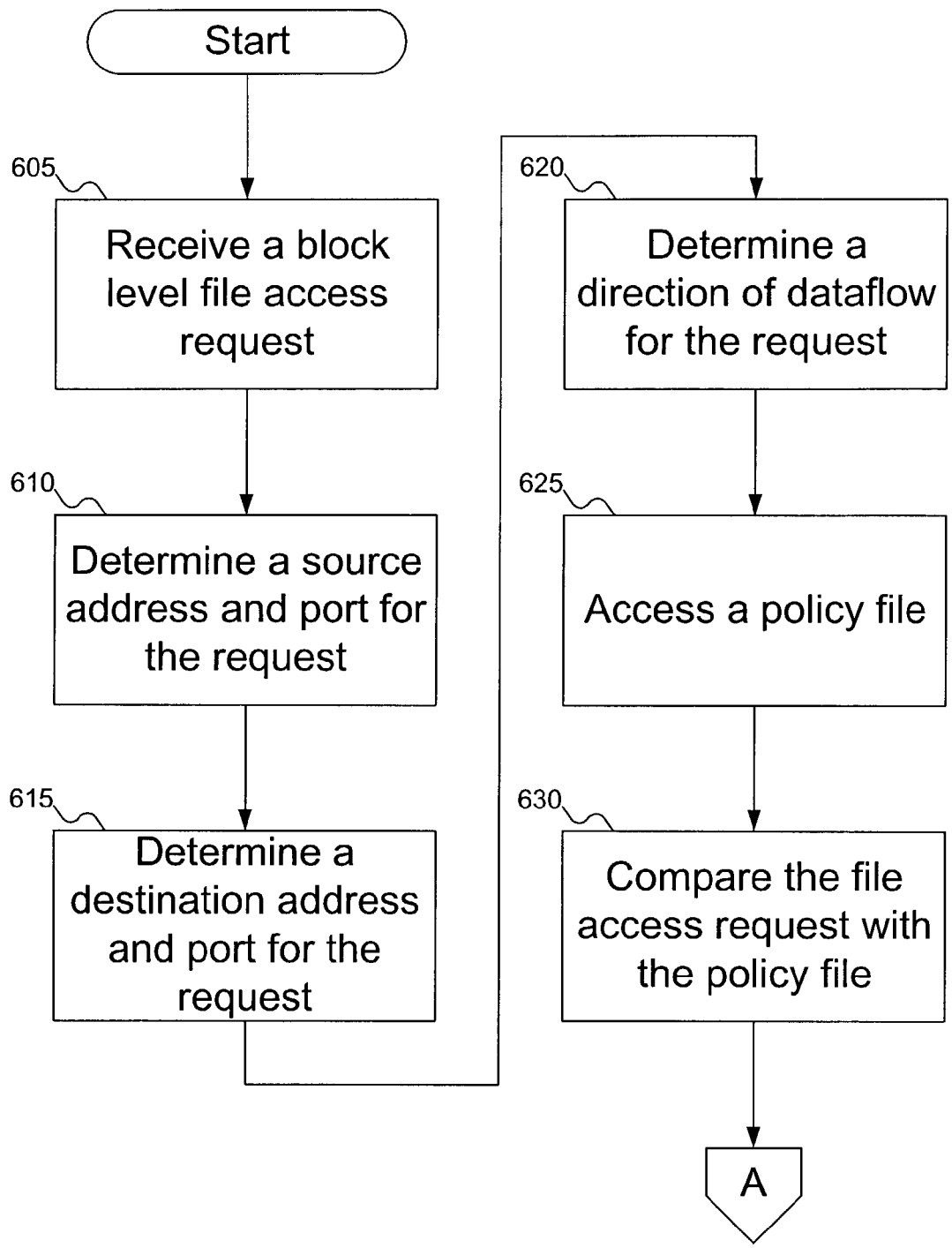
FIGS. 6A-6B show a flowchart of the procedure used by the data storage security driver of FIG. 2 to accept or reject a file access request, according to an embodiment of the invention.
Figure 6B:
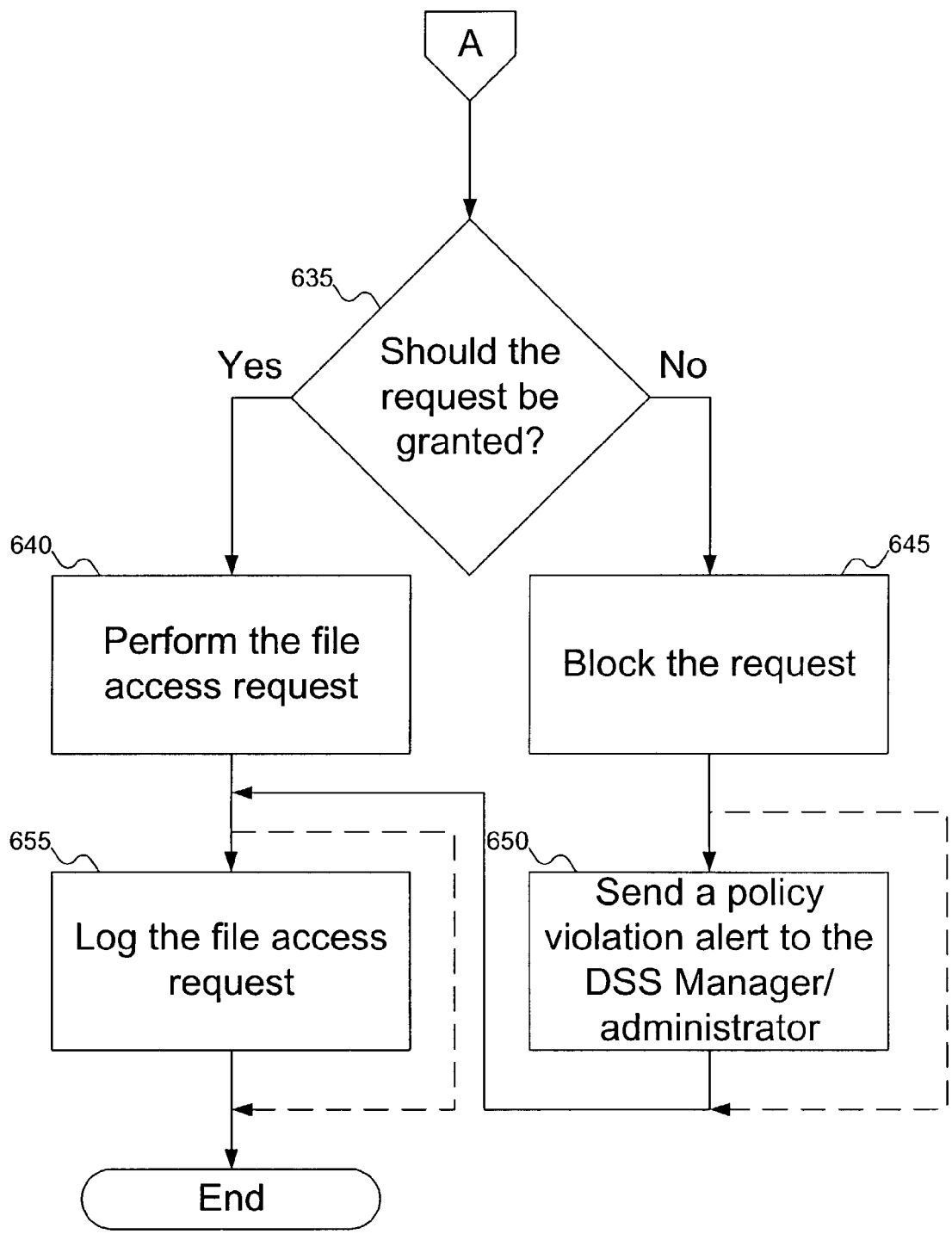

FIGS. 6A-6B show a flowchart of the procedure used by the data storage security driver of FIG. 2 to accept or reject a file access request, according to an embodiment of the invention. In FIG. 6A, at block 605, the data storage security driver receives a block level file access request. At block 610, the data storage security driver determines a source IP address and port. At block 615, the data storage security driver determines a destination IP address and port. At block 620, the data storage security driver determines a direction for the dataflow. At block 625, data storage security driver accesses the local policy database, and at block 630, the data storage security driver compares the file access request with the local policy database.

At block 635 (FIG. 6B), the data storage security driver determines if the file access request is to be granted. If it is, then at block 640, the data storage security driver performs the file access request. Otherwise, at block 645, the data storage security driver blocks the file access request, and at block 650 a policy violation alert is sent to the administrator or the DSS Manager. Finally, at block 655 the file access request (and whether or not it was performed) is logged.

As shown by the dashed lines, issuing a policy violation alert and logging the file access request are optional, but recommended. Issuing the policy violation alert enables recovering sooner from a hacking attack. Logging file access requests, whether or not performed, allows for forensic analysis of DSS activity. Since preventing and/or recovering from attacks are important functions, issuing alerts and logging actions is recommended.

As mentioned above, an advantage of an embodiment of the invention is data security. Hackers may not directly access the data on DSS 205. And even if a hacker is able to gain root access to server 105, the hacker will not know the correct port(s) on which to make data requests, and so will be unable to breach the security around the data, even though server 105 was compromised.

Figure 7:
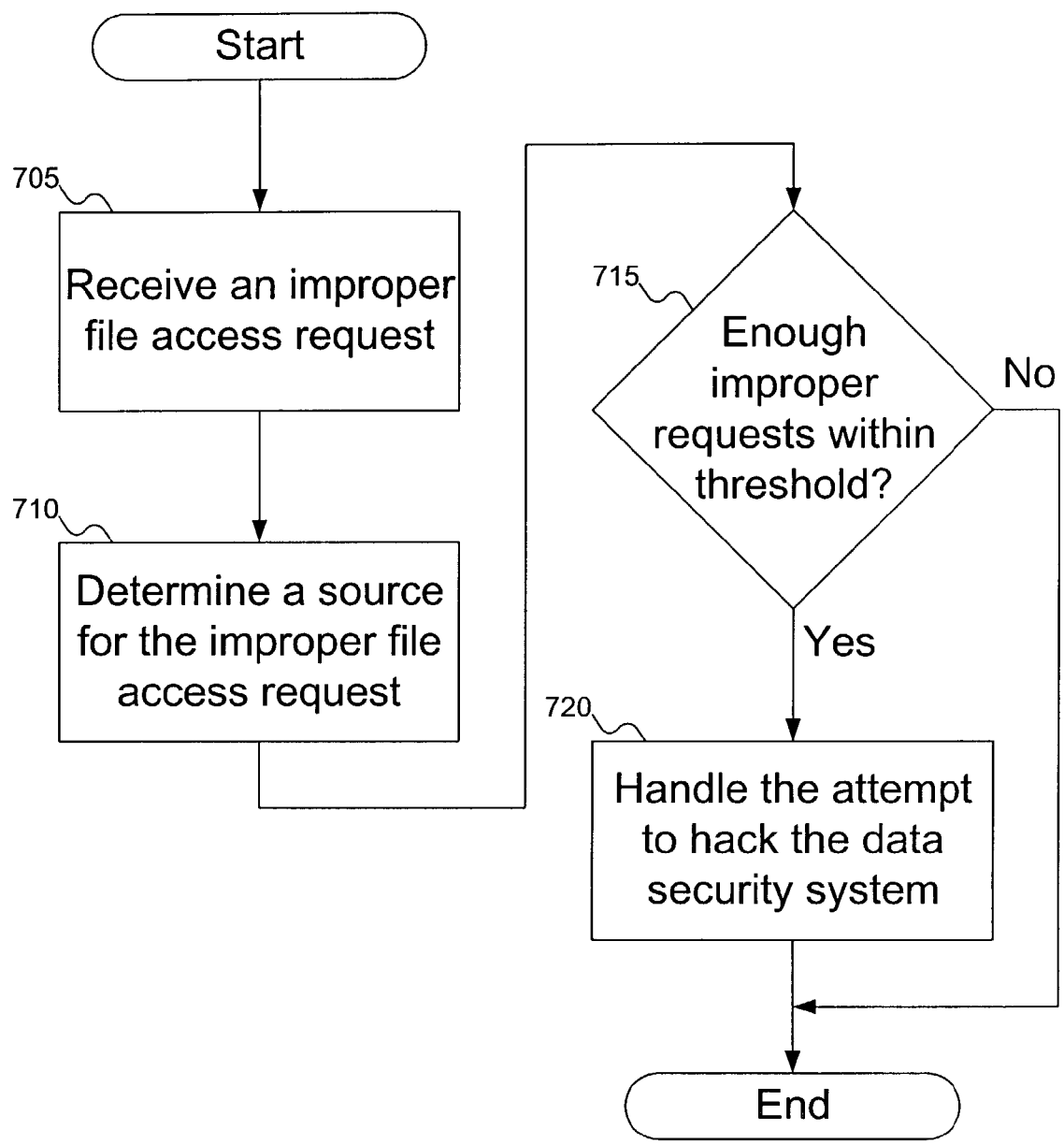
FIG. 7 shows a flowchart of the procedure used by the data storage security driver of FIG. 2 to detect an intrusion attempt, according to an embodiment of the invention.

Of course, after hacking into server 105, the hacker might try sending data requests on every port on server 105 (and to every port on data security system 205). But another advantage of an embodiment of the invention is the ability to detect intrusion attempts. FIG. 7 shows a flowchart of the procedure used by the data storage security driver of FIG. 2 to detect an intrusion attempt, according to an embodiment of the invention. At block 705, the data storage security driver receives an improper file access request (that is, a file access request that is not permitted by the local policy database). At block 710, the data storage security driver determines the source of the file access request (typically, source IP address and port, but other combinations of data may be used). At decision point 715, the data storage security driver checks to see how many improper file access requests have been received from that source. Decision point 715 may also factor in time: for example, the number of improper file access requests received from that source in the last day. If the number of improper file access requests exceeds a threshold, then some action is taken to address the attempt to hack the data security system. For example, an administrator may be notified and/or access from that particular source may be automatically blocked until the administrator investigates and unlocks the automatic block. A person skilled in the art will recognize other techniques that may be used to address the attempt to hack the data security server.

A person skilled in the art will recognize that an embodiment of the invention described above may be implemented using a computer. In that case, the method is embodied as instructions that comprise a program. The program may be stored on computer-readable media, such as floppy disks, optical disks (such as compact discs), or fixed disks (such as hard drives). The program may then be executed on a computer to implement the method. A person skilled in the art will also recognize that an embodiment of the invention described above may include a computer-readable modulated carrier signal.

Having illustrated and described the principles of the invention in an embodiment thereof, it should be readily apparent to those skilled in the art that the invention may be modified in arrangement and detail without departing from such principles. All modifications coming within the spirit and scope of the accompanying claims are claimed.

The invention claimed is:

1. A data storage security system on a network, comprising:
  a data security system connected to the network including a first logical port, the data security system communicatively coupled with a data storage including a file, the file comprising a plurality of blocks;
  a source computer connected to the network, the source computer including an address and a second logical port, wherein the source computer is operative to issue a block level request to access one or more blocks of the file, the block level request including the address of the source computer, an identifier for the second logical port of the source computer, and an identifier for the first logical port of the data security system;
  a data storage security driver installed in the data security system, the data storage security driver operative to provide block level access control to the blocks of the file, including a policy for accessing the file, the policy including an address and an identifier for the second logical port of the source computer that is permitted to access the file and a direction of data flow between the data security system and the source computer, and wherein the data storage security driver is operative to approve the block level file access request by comparing the block level access request to the policy; and
  a data storage security manager separate from the data security system and operative to define the policy in the data storage security driver, wherein the data storage security manager is designed to refuse an instruction to modify the policy if the source of the instruction is outside the data storage security manager, wherein the data storage security manager is operative to communicate with the data storage security driver using a specific communication protocol, the specific communication protocol including one or more of a specified port and a specified routing path, and wherein the data storage security driver is operative to update the policy following a communication from the data storage security manager including the specific communication protocol.

2. A data storage security system according to claim 1, wherein the request further includes a direction of data flow between the data security system and the source computer.

3. A data storage security system according to claim 1, wherein the policy further includes an identifier for the first logical port on the data security system through which the request may be directed.

4. A data storage security system according to claim 1, wherein the policy further includes that the file may be written to.

5. A data storage security system according to claim 1 wherein the policy further specifies that the file may be read.

6. The data storage security system of claim 1, further comprising:
  a second source computer connected to the network, the second source computer including an address and a third logical port; and
  a second source computer connected to access one or more blocks of the file issued by the second source computer, the second block level request including the address of the second source computer, an identifier for the third logical port of the source computer, and an identifier for the first logical port of the data security system.

7. A method for performing secure file operations, comprising:

receiving a block level file access request requesting access to blocks of a file;

determining a source location for the file access request including determining an address and an identifier for a logical port of a source computer from which the file access request issued;

determining a direction for a datum of the file access request to flow;

determining a routing path through which the file access request is received;

determining an identifier for a logical port on a data security system to which the file access request was directed;

verifying that the file access request may be approved or refused based on the combination of the source location, the routing path, and the determined direction of data flow, wherein verifying that the file access request may be approved or refused includes comparing the file access request with a policy; and if the file access request is verified, performing the file access request, including accessing a block of the files;

receiving a request to update the policy, the request including a communication protocol;

verifying the communication protocol; updating the policy if the communication protocol is verified; and refusing to update the policy if the communication protocol is not verified.

8. A method according to claim 7, wherein receiving a block level file access request includes receiving a block level file read request.

9. A method according to claim 7, wherein receiving a block level file access request includes receiving a block level file write request.

10. An article comprising a machine-accessible physical medium storing associated data that, when accessed, results in a machine:

receiving a block level file access request requesting access to blocks of a file;

determining a source location for the file access request including determining an address and a logical port of a source computer from which the file access request issued;

determining a routing path for the file access request;

determining a direction for a datum of the file access request to flow;

determining a logical port on a data security system to which the file access request was directed;

verifying that the file access request may be performed or refused based on the combination of the source location, the routing path, and the determined direction of data flow, including comparing the file access request with a policy; and if the file access request is verified, performing the file access request, including accessing the blocks of the file;

receiving a request to update the policy, the request including a communication protocol;

verifying the communication protocol;

updating the policy if the communication protocol is verified; and refusing to update the policy if the communication protocol is not verified.

11. An article according to claim 10, wherein the associated data for receiving a block level file access request includes associated data for receiving a block level file read request.

12. An article according to claim 10, wherein the associated data for receiving a block level file access request associated data for includes receiving a block level file write request.

* * * * *

UNITED STATES PATENT AND TRADEMARK OFFICE
CERTIFICATE OF CORRECTION

| | | |
|---|---|---|
| PATENT NO. | : 7,343,488 B2 | Page 1 of 1 |
| APPLICATION NO. | : 10/261825 | |
| DATED | : March 11, 2008 | |
| INVENTOR(S) | : Satyendra Yadav | |

It is certified that error appears in the above-identified patent and that said Letters Patent is hereby corrected as shown below:

Column 6, line 56, claim 4, the phrase "to claim 1 wherein" should read --to claim 1, wherein--;

Column 6, line 63, claim 6, the words "second source computer connected to" should read --second black level request to--;

Column 7, line 26, claim 7, the phrase "of the files;" should read --of the file;--.

Signed and Sealed this

Fourteenth Day of April, 2009

JOHN DOLL
*Acting Director of the United States Patent and Trademark Office*